United States Patent
Chiavarotti et al.

(10) Patent No.: US 6,456,483 B1
(45) Date of Patent: Sep. 24, 2002

(54) ELECTRODES FOR ELECTROLYTIC CAPACITORS AND PRODUCTION PROCESS THEREOF

(75) Inventors: Giovanni Pietro Chiavarotti, Milan; Tarcisio Maria Cagnin, eceased, late of Milan, both of (IT), by Fabrizio Cagnin, Silvia Francesca Cagnin, Maria Cesarina Andreoni, legal representatives

(73) Assignee: Becromal S.p.A., Milan (IT)

(*) Notice: Subject to any disclaimer, the term of this patent is extended or adjusted under 35 U.S.C. 154(b) by 0 days.

(21) Appl. No.: 09/549,039

(22) Filed: Apr. 13, 2000

(30) Foreign Application Priority Data

Apr. 14, 1999 (IT) .......................... RM99A0225
Apr. 7, 2000 (EP) ............................. 00107518

(51) Int. Cl.[7] ................................. H01G 9/04
(52) U.S. Cl. ................ 361/508; 361/523; 361/528; 361/512; 428/461; 428/322; 29/25.03
(58) Field of Search ................ 361/508, 512, 361/433, 506, 313, 308, 312, 523, 528, 509, 504; 428/461, 332; 29/25.03

(56) References Cited

U.S. PATENT DOCUMENTS

| 4,740,385 | A | * | 4/1988 | Feuerstein et al. ............ 427/38 |
| 4,888,666 | A | * | 12/1989 | Naitoh et al. ................ 361/512 |
| 5,032,461 | A | * | 7/1991 | Shaw et al. ................. 428/461 |
| 5,482,743 | A | * | 1/1996 | Allegret et al. ............. 427/566 |
| 5,693,415 | A | * | 12/1997 | Zait et al. ................... 428/332 |
| 5,963,417 | A | * | 10/1999 | Anderson et al. ........... 361/503 |

* cited by examiner

Primary Examiner—Anthony Dinkins
Assistant Examiner—Nguyen T Ha
(74) Attorney, Agent, or Firm—Wenderoth, Lind & Ponack, L.L.P.

(57) ABSTRACT

This invention refers to a process for the production of an electrode for electrolytic capacitors made of a conductive substrate (7) onto which a porous layer of aluminium oxide is deposited on both sides in at least a two-phase process by vacuum deposition of unstoichiometric aluminium oxide in a reactive atmosphere and a following surface oxidation process by a treatment under reactive plasma as well as a roll-to-roll system for such production and an electrode made by such process.

2 Claims, 1 Drawing Sheet

ELECTRODES FOR ELECTROLYTIC CAPACITORS AND PRODUCTION PROCESS THEREOF

BACKGROUND OF THE INVENTION

1. Field of the Invention

The present invention refers to electrodes for electrolytic capacitors and their production process.

2. Description of the Related Art

It concerns the technical field of materials for electronic devices, especially for electrolytic capacitor applications, which are widely used in electric circuitry applications. Up to the present date, the techniques of manufacturing an electrode for electrolytic capacitors are based on electrochemical processes where the increase of area is obtained by material removal, e.g. by electrochemical etching. However, due to removal of material, the thickness of the substrate in present electrochemical technologies has to be about 100 $\mu$m being comparatively thick with respect to miniaturized applications. Further, the production process is expensive since total power consumption for electrochemical processes is high and chemical waste from production creates disposal problems.

SUMMARY OF THE INVENTION

Accordingly, it is the object of the invention to provide an improved electrode with high capacitance, which enables the use of thin substrate material, and is cheaper, and avoids chemical waste during production, and a production process thereof.

BRIEF DESCRIPTION OF THE DRAWINGS

This object is solved by the present invention providing a process for the production of an electrode for electrolytic capacitors made of a conductive substrate onto which a porous layer of aluminium oxide is deposited on both sides in an at least two-phase process. This process consists of at least a vacuum deposition of unstoichiometric aluminium oxide in a reactive atmosphere and a following surface oxidation process by a treatment under reactive plasma.

With this advanced technology the use of a substrate with thickness between 15 to 30 $\mu$m is possible, because the substrate is not weakened by removal of material, but new material is deposited thereon. The thinner substrate provides electrodes with a higher volume capacitance. Further, since the vacuum process does not create any chemical waste there are no disposal problems and this process is environmentally advanced. In addition, the power consumption for the production of the electrode in the vacuum deposition process is less than the total power consumption needed for the electrochemical technology, reaching equal or higher volume capacitance. Thus, the production process according to the present invention is economically convenient. A further advantageous aspect of the invention is the creation of spongy structures showing a high specific area, which are stabilized by a process of plasma oxidation by means of a material addition technique.

Figure 1:
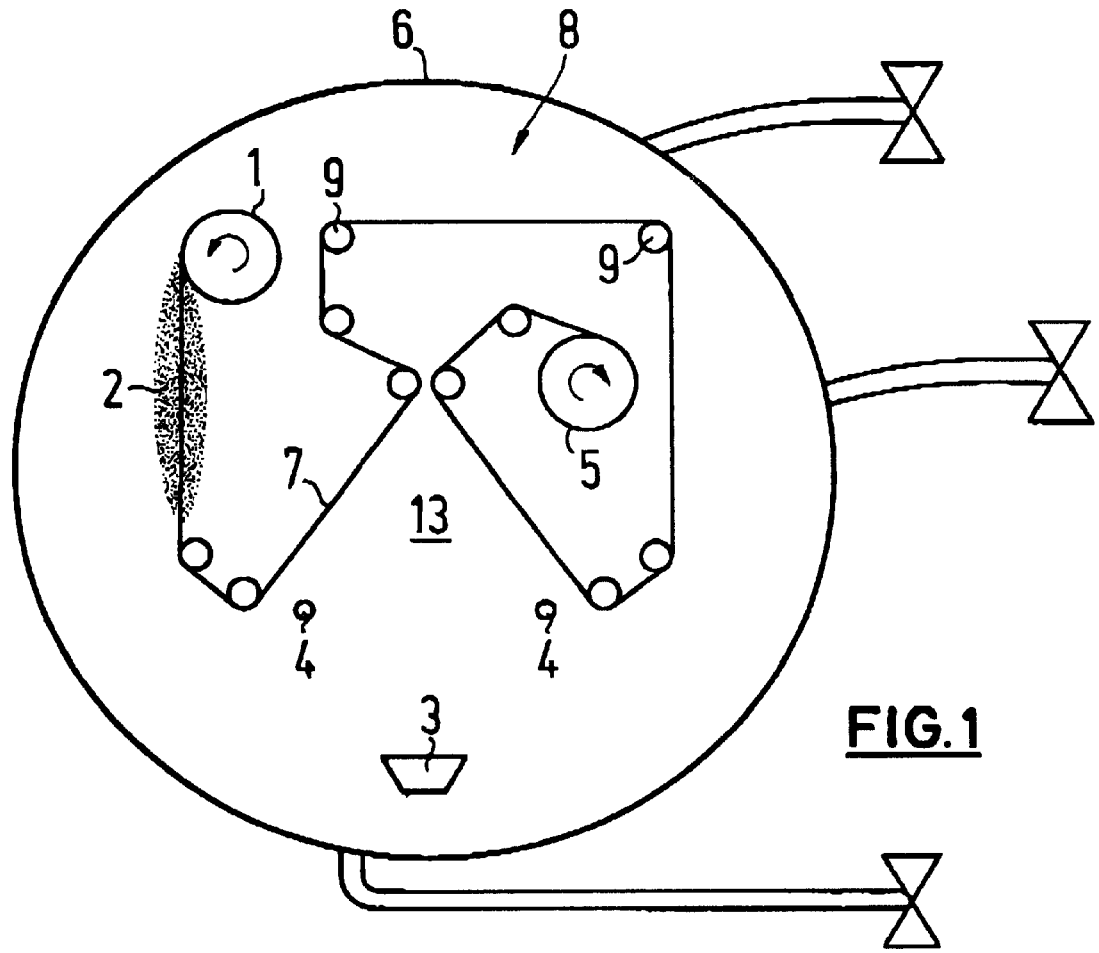

In an advantageous development of the present invention, a pretreatment under reactive plasma in an oxidizing atmosphere is applied to the substrate prior to the vacuum deposition of aluminium oxide in order to clean and activate the substrate surface and to enable and enhance reliable attachment of aluminium oxide thereon.

Preferably, the deposition of unstoichiometric aluminium oxide is obtained by a reaction of evaporated aluminium at controlled rate and oxygen at controlled flow, the two sides of the substrate being guided at a predetermined angle with respect to each other and to the cloud of aluminium vapour.

In order to achieve easy handling of the substrate, it is guided in the guide device during the vacuum deposition of aluminium oxide and/or the pretreatment under reactive plasma. The guide device has an unwinding roll from which the substrate is unrolled, a rewinding roll on which the treated substrate is rolled and a plurality of guide rollers defining a mainly angled, spiral or wound spiral guide path for the substrate from the unwinding roll to the rewinding roll and a dome disposed above a source of aluminium vapour, the two inner sides of the dome exposed to the aluminium vapour belonging to the opposed surface sides of the substrate. In this arrangement, both sides of the substrate are automatically exposed to the vapour of aluminium oxide in one process with one aluminium source only.

The following treatment under reactive plasma can be performed according to the present invention in a chamber in an oxygen atmosphere at low pressure, the substrate being guided through said chamber in continuous operation. In this arrangement, only two rolls for unwinding and rewinding the substrate are needed, the substrate being tightened between the two rolls while passing through the chamber.

If the substrate is to be used as anodic electrode the substrate is preferably submitted to the final anodic oxidation process. Such can be performed in a solution of ammonium adipate at a voltage between about 8 and 140 V.

Further, the invention is related to a "Roll-to-Roll"-system for the production of an electrode for electrolytic capacitors being disposed in a vacuum deposition chamber having inlet and outlet ports and a guide device with an unwinding roll, a rewinding roll and a plurality of guide rollers defining a mainly angled, spiral or wound guide path for the substrate from the unwinding roll to the rewinding roll and a dome disposed above a source of metallic, e.g. aluminium, vapour, the two inner sides of the dome exposed to the vapour belonging to the opposed surface sides of the substrate.

The present invention is related as well to an electrode for electrolytic capacitors made of a conductive substrate with an unstoichiometric porous layer of aluminium oxide on both sides which is produced in a process described above. The electrode preferably has a layer of aluminium oxide with a dendritic structure.

Other features, advantages and possible uses of the present invention will be discussed in more detail below with reference to the accompanying drawings. It is to be understood that the scope of the present invention is intended to encompass all features described and illustrated independently or in any appropriate combination.

BRIEF DESCRIPTION OF THE DRAWINGS

Figure 2:
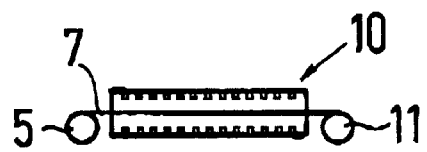
Figure 3:
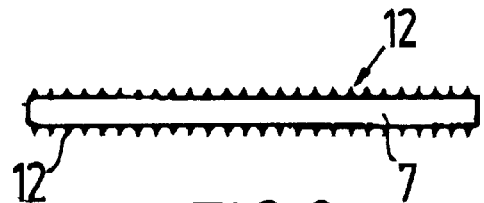

FIG. 1 shows a "Roll-to-Roll"-system for the production of an electrode for electrolytic capacitors according to the present invention;

FIG. 2 shows a system for the treatment of the substrate of the electrode under reactive plasma in a reactive atmosphere, and FIG. 3 shows the structure of the substrate.

DESCRIPTION OF THE PREFERRED EMBODIMENTS

The electrode for electrolytic capacitors obtained by the process described below is made of a conductive substrate 7, e.g. an aluminium foil with purity between 99.5% and 99.99%.

The substrate 7 is disposed on an unwinding roll 1 placed in a manufacturing "Roll-to-Roll"-system (FIG. 1). During its unwinding, the substrate 7 is in a first phase pretreated under plasma 2 generated by a RF between 50 and 500 kHz in the presence of oxygen that is as well necessary for a further step of the reaction.

This pretreatment is advantageous in order to increase the adhesion of the dendritic porous structure which is building-up during the following phase of reaction as well as to level the distribution on the substrate surfaces. Further, this pretreatment eliminates all possible pollution agents. Without such a pretreatment, the following dendritic growth occurs in a manner that it is not so uniform. The pretreatment is therefore important for obtaining the final product.

After said pretreatment, the deposition of unstoichiometric aluminium oxide on both surface sides of the substrate takes place in a reactive atmosphere, obtained by the reaction between aluminium vapour coming from source 3 and oxygen blown into the reaction chamber 6 by two distributing inlet ports 4. The flow of oxygen shall be collimated with respect to the material of the beam of the vaporized aluminium. The distance between the substrate 7 and the inlet ports 4 of the reactive gas might be changed, thus obtaining a different dendritic morphology.

The ratio between aluminium and oxygen is kept constant by checking the partial pressures of the oxygen and the cloud of aluminium vapour. The partial pressure of aluminium is kept constant by checking the oxygen inlet flow while keeping the partial vapour pressure constant by checking the deposition rate. The deposition method might be of thermal type, Joule effect or by electron gun.

The two sides of the substrate are guided with a certain angle shot between the substrate itself and the cloud of aluminium vapour. By changing the deposition rate of aluminium, the oxygen partial pressure and the incidence angle, spiral or wound between the substrate and the cloud of aluminium vapour, different stoichiometrics of deposited aluminium are obtained as well as different dendritic morphologies For instance, by a chamber pressure, due to gas emission between 1 and $3 \times 10^{-2}$ Pa, a deposition rate between 3 and 5 g/minute of aluminium and an angle between the substrate 7 and the cloud of aluminium vapour of about 45° and 70°, the effective area increases by a factor of 200 to 500 with respect to the apparent geometric area.

The substrate 7 is positioned on a guide device 8, so that it passes first the aluminium source 3 with one side and afterwards with the other side after a turn of substrate 7 around guide rollers 9. Finally, the substrate 7 is rolled on the rewinding roll 5. In this way, a simultaneous deposition of aluminium oxide occurs on both sides of the substrate 7.

Up to now, the first process treatment was described. The rewinding roll 5 is then removed from the guide device 8 and submitted to an additional treatment described hereafter. The substrate 7 undergoes an additional process of surface oxidation by a treatment under active plasma. The substrate 7 is unrolled from roll 5, run through chamber 10 and rolled on a new roll 11. Inside chamber 10, a plasma is created in an oxygen atmosphere at low pressure using a RF from 50 to 500 kHz and a power from 2 to 3 KVA. Scope of this last process is to increase the ratio of oxygen with regard to the aluminium on the surface. It has been experimentally ascertained that this enrichment of surface oxygen accounts for the stability of the dendritic structure over time, i.e stability of the electric capacitance.

The substrate 7 onto which this dendritic structure 12 was deposited by the above described process might now be used as anodic or cathodic electrode for electrolytic capacitors. When the dendritic structure is used as an anodic electrode, it preferably undergoes an anodic oxidation process in a solution of ammonium adipate at 10% in weight of concentration. The anodic oxidation at a fixed voltage between about 8 and 140 v enables the creation of an aluminium oxide barrier, which forms the dielectric of the electrolytic capacitor.

The value of the specific, electric capacitance per surface unit obtained after the anodic oxidation depends on the morphology of the dendritic layer obtained by the above mentioned processes. It was experimentally noticed that the capacitance value worsens over time without the oxidation process under plasma, losing about 30% of the initial value after a month since manufacturing.

When the above mentioned structure is used as a cathodic electrodes it does not require neither a stabilization process nor an anodic oxidation.

The present invention provides a process for a production of electrodes for electrolytic capacitors to be implemented in a vacuum deposition chamber by means of vapour deposition of aluminium in a reactive atmosphere onto a substrate of conductive material, such as an aluminium foil. Electrodes obtained by this process show dendritic structures of unstoichiometric aluminium oxide with a high specific capacitance on the surface, this process being then followed by an additional treatment in a reactive plasma athmosphere. Thus, with the present invention concerning the technical field of materials for electronics, especially for applications in electrolytic capacitors, no chemical waste are produced since all operations are of a physical type. The electrodes according to the present invention are accordingly of better quality and have lower production costs compared to the known solutions.

LIST OF REFERENCES

1 Unwinding roll
2 Plasma
3 Aluminium source
4 Inlet port
5 rewinding roll
6 Vacuum deposition chamber
7 Substrate
8 Guide device
9 Guide roller
10 Chamber
11 Roll
12 Dendritic structure
13 Dome

What is claimed is:

1. An electrode for electrolytic capacitors comprising a conductive substrate having a porous layer of non stoichiometric aluminium oxide on both sides of said conductive substrate, said porous layer of non stoichiometric aluminium oxide having a dendritic structure.

2. An electrolytic capacitor comprising at least one of the electrode according to claim 1.

* * * * *